United States Patent [19]
Bray

[11] Patent Number: 5,562,125
[45] Date of Patent: Oct. 8, 1996

[54] TWO STAGE ELECTROHYDRAULIC PRESSURE CONTROL VALVE

[75] Inventor: Steven C. Bray, Washington, Ill.

[73] Assignee: Caterpillar Inc., Peoria, Ill.

[21] Appl. No.: 533,727

[22] Filed: Sep. 26, 1995

[51] Int. Cl.$^6$ .................................................. F15B 13/043
[52] U.S. Cl. .................... 137/625.64; 91/433; 192/109 F
[58] Field of Search ......................... 91/433; 137/625.64; 192/109 F

[56] References Cited

U.S. PATENT DOCUMENTS

| | | | |
|---|---|---|---|
| 5,051,631 | 9/1991 | Anderson | 310/14 |
| 5,054,599 | 10/1991 | Marcott | 192/109 F |
| 5,136,898 | 8/1992 | Hirose | 137/625.6 |

*Primary Examiner*—Gerald A. Michalsky
*Attorney, Agent, or Firm*—John W. Grant

[57] ABSTRACT

A two stage electrohydraulic pressure control valve includes a pilot stage for providing regulated pressure at lower flows to a larger main stage that handles the higher control flows to and from a pressure applied clutch or pressure released brake. The regulated pressure from the pilot stage acts on an end of the main stage for controlling the position of the main stage. An energy storage device in the form of either an accumulator or a load piston device is connected to the end of the main stage to permit instantaneous independent movement of the main stage relative to the pilot stage. The energy storage device quickly provides for or accepts displaced fluid from the main stage much faster than the limited flow capacity and response time of the pilot stage. This permits the main stage to quickly adjust to flow changes to the clutch or brake with minimal change in pressure until the pilot stage can respond.

4 Claims, 2 Drawing Sheets

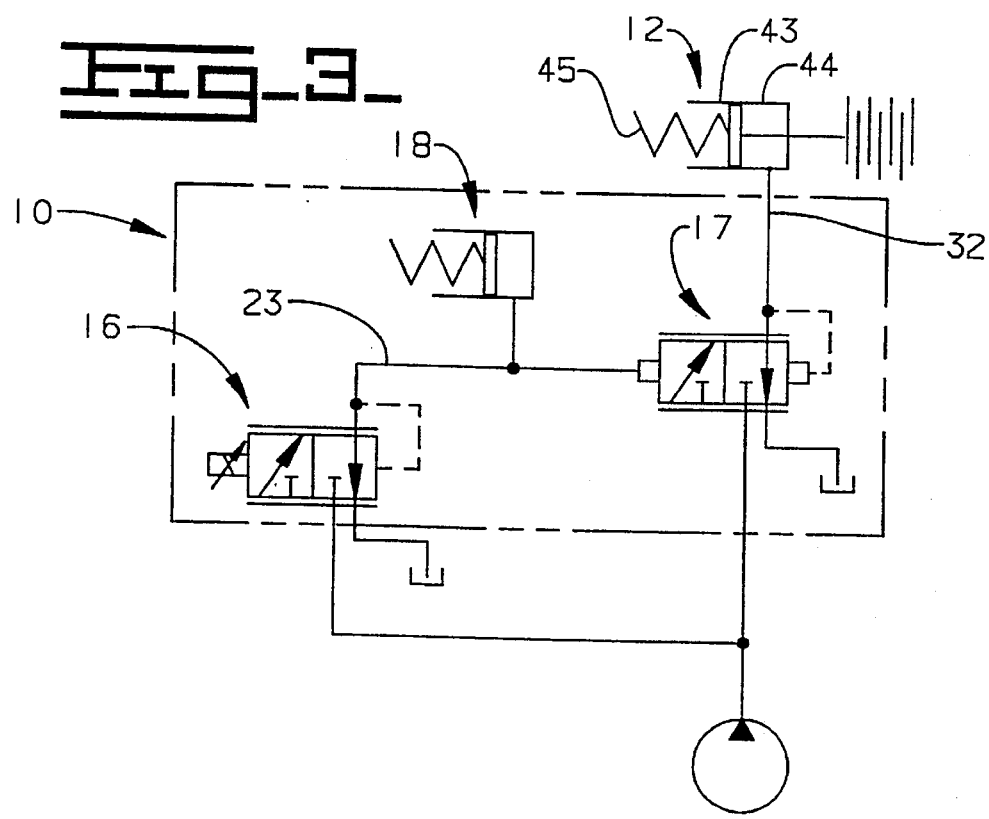
Fig_3_
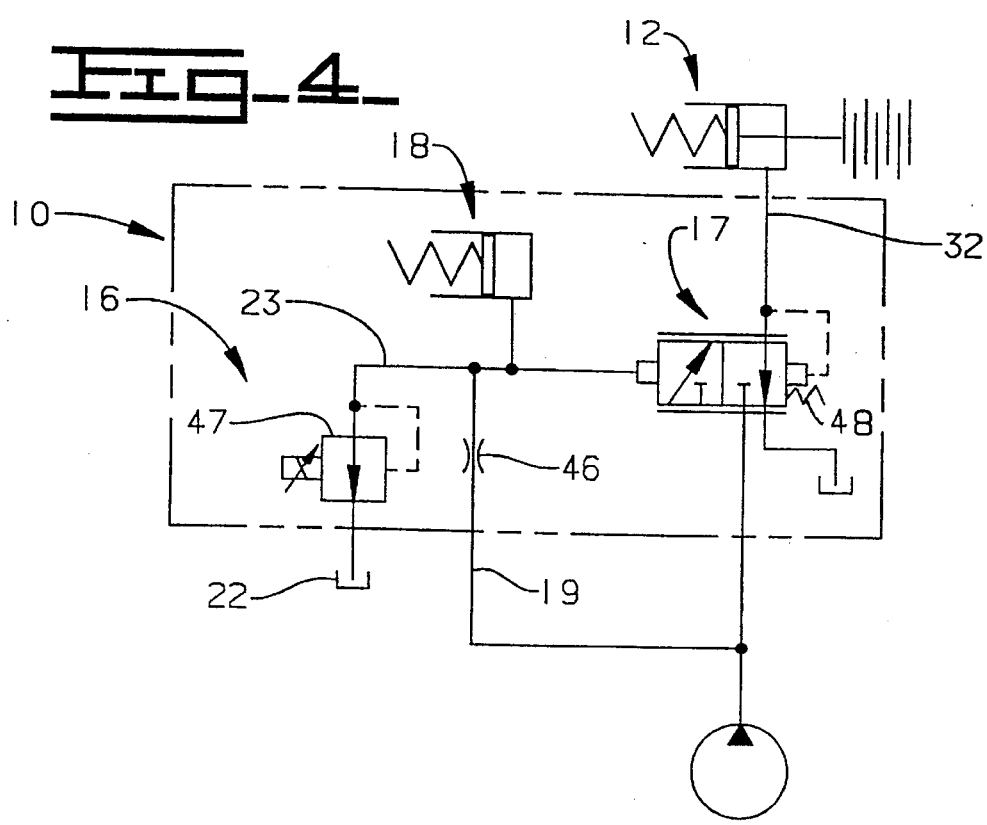
Fig_4_

TWO STAGE ELECTROHYDRAULIC PRESSURE CONTROL VALVE

TECHNICAL FIELD

This invention relates generally to a two stage electrohydraulic pressure control valve and, more particularly, to such a control valve having an energy storage device for permitting the second stage to move independently of the first stage.

BACKGROUND ART

Two stage electrohydraulic pressure control valves are commonly used in applications where the output pressure is generally proportional to an electronic signal. Such control valves are generally stable when the actuator being controlled by the control valve is subjected to substantially constant pressures or small changes in flow gain during actuation. However, a problem was encountered when those control valves were used to actuate clutches or brakes wherein a piston directly provides engagement force or opposes a spring that provides the engagement force. In both cases, most of the piston movement toward engagement of the clutch or brake occurs at nearly maximum flow at nearly constant pressure. When the clutch or brake actuator piston reaches its end of travel and the brakes or clutches start to engage, the flow demand or gain changes abruptly from high flow with low rate of pressure change to low flow with high rate of pressure change. Since the first stage must respond to the sudden change in flow gain before the second stage can move, the control valve overshoots resulting in harsh or erratic engagement of the clutch or brake.

Thus, it would be beneficial to provide a device to decouple the second stage from the first stage under large changes in flow gain to permit the second stage to quickly adjust to such large changes in flow gain with minimal change in pressure until the first stage can respond for improved stability.

The present invention is directed to overcoming one or more of the problems set forth above.

DISCLOSURE OF THE INVENTION

In one aspect of the present invention, a two stage electrohydraulic pressure control valve for use in a hydraulic system in which the output flow demand from the control valve suddenly changes from a high flow condition to a low flow, pressure controlled condition includes a solenoid controlled pilot stage and a force controlled main stage having first and second ends and a control port connected to the first end. An energy storage device is connected to the pilot stage and the second end of the main stage for allowing instantaneous independent movement of the main stage relative to the pilot stage.

BRIEF DESCRIPTION OF THE DRAWINGS

FIGS. 1–4 are schematic illustrations of various embodiments of the present invention.

BEST MODE FOR CARRYING OUT THE INVENTION

Figure 1:
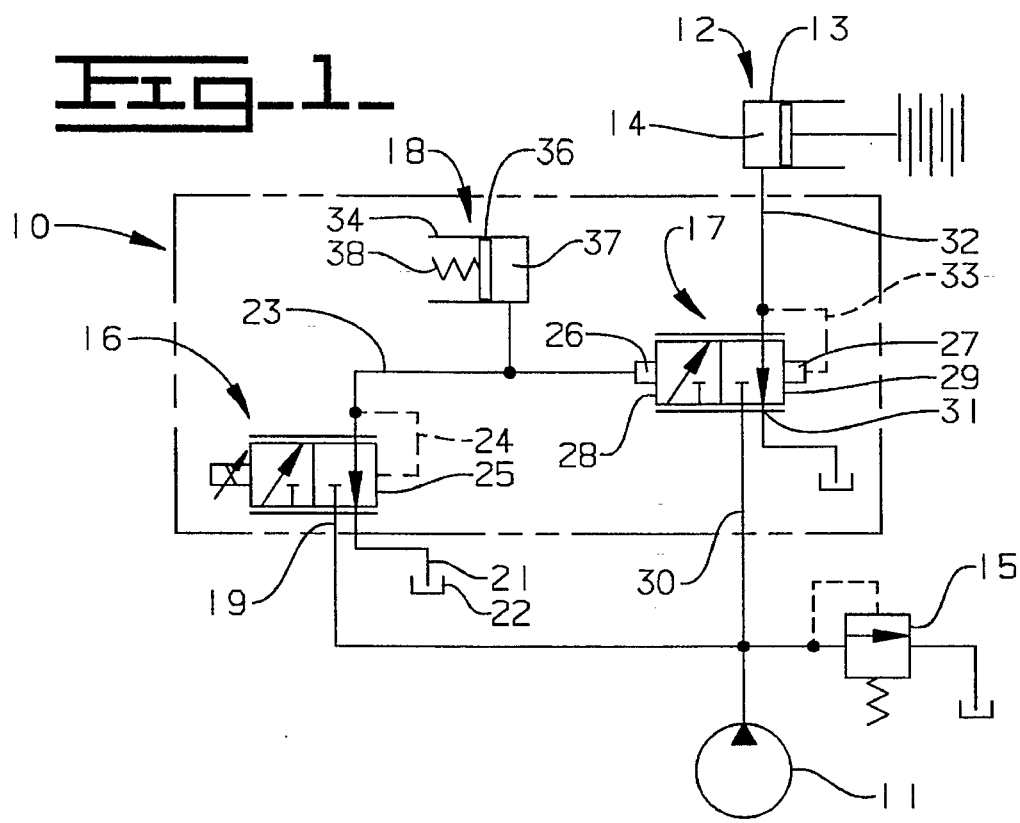

Referring now to FIG. 1, a two stage electrohydraulic pressure control valve 10 receives fluid from a pump 11 and directs a control pressure to an actuator 12. The actuator in this embodiment is a pressure applied clutch 13 having an actuator chamber 14. A relief valve 15 is connected to the pump to limit the fluid pressure directed to the control valve 10 to a predetermined level.

The control valve includes a solenoid actuated pilot stage 16, a force controlled main stage 17, and an energy storage means 18 for allowing instantaneous independent movement of the main stage relative to the pilot stage. The pilot stage 16 has an input port 19 connected to the pump 11, a drain port 21 connected to a tank 22, a regulated pressure passage 23, and a feedback line 24 connecting the passage 23 to an end 25 of the pilot stage.

The main stage 17 has a pair of pilot chambers 26,27 at its opposite ends 28,29, an input port 30 connected to the pump 11, a drain port 31 connected to the tank 22, a control port 32 connected to the actuator 12, and a feedback line 33 communicating the port 32 with the pilot chamber 27. The passage 23 is connected to the pilot chamber 26. The pilot stage 16 provides regulated pressure at lower flows for the larger main stage 17 that handles the main control flow from the pump 11 to the actuator 12.

The energy storage means 18 is connected to the pilot stage 16 and the pilot chamber 26 at the end 28 of the main stage 17 and includes an accumulator 34 having a piston 36, a fluid chamber 37 defined at one side of the piston and connected to the passage 23 and a spring 38 disposed at the other side of the piston 36. While the accumulator 34 is shown separated from the second stage, they can advantageously be positioned within a common bore and share a common chamber.

Figure 2:
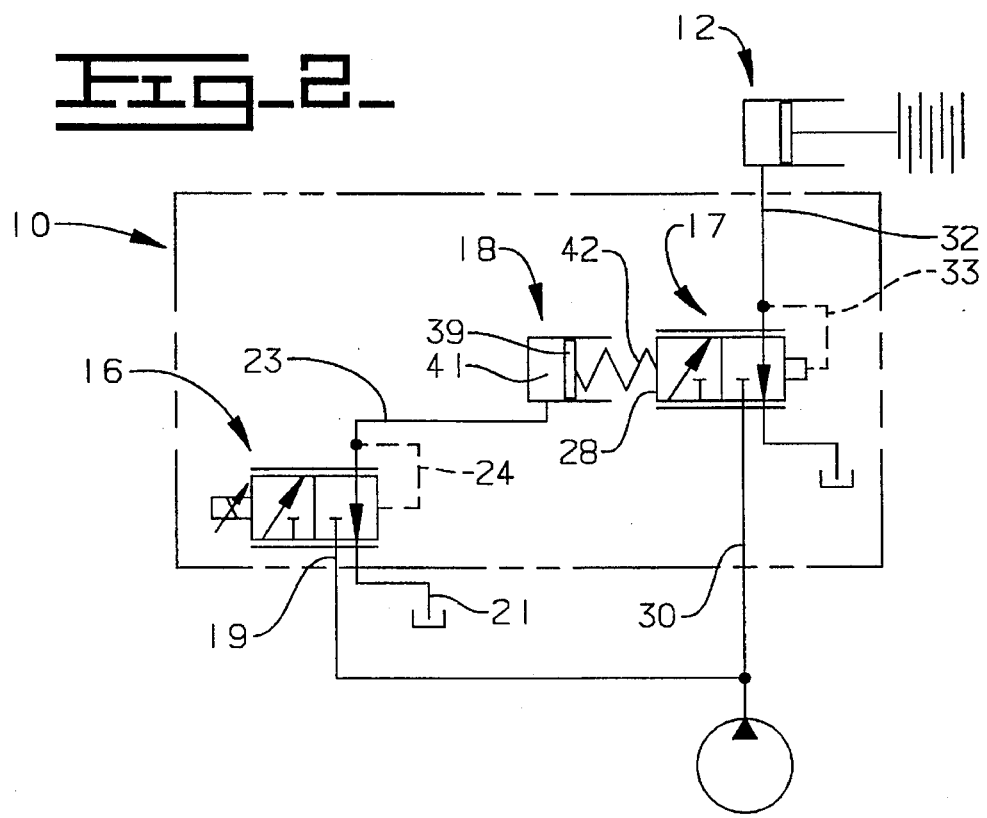

In the embodiment of FIG. 2, the energy storage means 18 includes a load piston 39, a fluid chamber 41 connected to the passage 23 and a spring 42 disposed between the load piston 39 and the end 27 of the second stage 17.

The control valve 10 of the embodiment of FIG. 3 is identical to that of FIG. 1. However, the actuator 12 is a spring applied pressure released brake 43 having a fluid chamber 44 connected to the outlet port 32 and a spring 45 for applying the brake.

In the embodiment of FIG. 4, the pilot stage 16 includes a fixed supply orifice 46 disposed in the input port 19 and a two way proportional relief valve 47 between the passage 23 and the tank 22. Additionally, a bias spring 48 is included to bias the main stage 17 to the position shown to allow the pressure in the control port 32 to go to zero. Moreover, the energy storage means 18 disclosed in FIG. 2 can alternatively be substituted for the energy storage device 18 of this embodiment. Likewise, this embodiment can be utilized for actuation of a pressure applied clutch as disclosed in FIG. 1 in place of the pressure released brake as disclosed.

The energy storage means has a predetermined pressure range and is sized so that the dynamic pressure changes caused by displacement of the main stage from the fully open position to the closed position is less than about 25 percent of the predetermined pressure range of the energy storage means and more specifically is in the range of about 8 percent to 4 percent.

INDUSTRIAL APPLICABILITY

In operation, the pilot stage 16 provides a regulated pressure at lower flows for displacing the larger main stage that handles the main control flow to and from the actuator 12 so that the control pressure in the control port 32 is essentially proportional to the electrical input signal to the pilot stage.

The pilot and main stages in FIG. 1 are shown in a clutch disengaged position wherein the accumulator chamber 37 and the pilot chamber 26 communicate with the tank 22. Engaging the clutch from this condition is initiated by energizing the pilot stage 16 with an electrical signal to move the pilot stage rightward to an operating position, increasing the pressure in the regulated pressure passage 23. Increasing the regulated pressure in the passage 23 starts to fill the accumulator chamber 37 and moves the main stage 17 rightward to an operating position at which fluid flow from the pump is communicated to the clutch chamber 14. The pressure required to fill the clutch chamber 14 is significantly lower than the control pressure required to engage the clutch. Thus, pressure in the control port 32 and the feedback passage 33 is initially lower than the pressure in the passage 23. This allows the main stage to move toward its fully open position to quickly fill the clutch chamber 14. In the meantime, the pressure in the passage 23 reaches a level proportional to the electrical signal. Once initial engagement of the clutch is established, the pressure in the control port 32 and the passage 33 increases rapidly to a level at which the main stage is biased leftward toward a reduced flow position. The accumulator initially absorbs the fluid displaced from the pilot chamber 26 to allow the main stage to quickly adjust to the sudden change in flow demand with minimal overshoot of the regulated pressure. This gives the pilot stage time to also readjust to a new position at which the control pressure in the control port 32 is proportional to the electrical signal. The accumulator quickly accepts the displaced fluid much faster than the limited flow capacity and response time of the first stage to thereby attenuate disturbances with minimal overshoot and greatly improves stability.

Disengagement of the clutch is accomplished by de-energizing the pilot stage, allowing it to move to the position shown communicating the accumulator chamber 37 and the pilot chamber 26 to the tank. This allows the main stage 17 to also move to the position shown to communicate the clutch chamber 14 with the tank.

The pilot and main stages in FIG. 2 are also shown in the clutch disengaged position wherein the chamber 41 and the passage 23 communicate with the tank. Engagement of the clutch of this embodiment is also initiated by energizing the pilot stage for increasing the pressure in the passage 23 and the chamber 41. The increasing pressure in the chamber 41 causes the spring 42 to bias the main stage 17 rightward to its operating position to quickly fill the clutch chamber 14. Once the clutch is initially engaged, the pressure in the control port 32 and the passage 33 increases rapidly to a level biasing the main stage leftward toward a reduced flow position. The leftward movement of the main stage is instantaneously absorbed by the spring 42 until the pilot stage readjusts to a position at which the pressure in the control port 32 is proportional to the electrical signal.

The embodiment of FIG. 3 is shown in a condition at which the spring applied pressure released brake is engaged. Disengaging the brake is initiated by directing an electrical signal to energize the pilot stage 16 to an operating position to increase the fluid pressure in the passage 23 and the accumulator chamber 37. The increasing pressure moves the main stage rightward to an operating position to communicate the pump with the actuating chamber 44 thereby compressing the spring 45. When the spring bottoms out, the pressure in the control port 32 and the passage 23 become proportional to the electrical signal and the accumulator is filled to a level commensurate with the pressure in the passage 23.

Engaging the brakes is initiated by decreasing the electrical signal to move the pilot stage leftward toward the position shown to communicate the passage 23 with the tank. This allows the main stage to also move leftward to communicate the brake chamber 44 with the tank. When this happens, the stored energy of the spring 45 quickly expels the fluid from the brake chamber 44 until initial engagement of the brake occurs. When this happens, the volume of fluid being expelled from the brake chamber 44 diminishes quickly and the pressure in the control port 32 drops below the pressure in the passage 23. The pressurized fluid in the accumulator chamber 37 is instantaneously directed to the pilot chamber 26 to urge the main stage rightward to quickly adjust to the sudden changes in flow demand with minimal changes in the control pressure in the passage 23. This gives the pilot stage time to readjust to a position at which the pressure in the control port is proportional to the electrical signal.

The operation of the embodiment of FIG. 4 is essentially identical to that of FIG. 1 with the exception that the regulated pressure in the passage 23 is obtained in a slightly different manner. More specifically, the pressure in passage 23 is regulated by controlling fluid flow through a fixed orifice 46 with the electrohydraulic relief valve 47. With the valve 47 in the de-energized position shown, the flow rate through the relief valve is greater than the flow rate through the fixed orifice 46 so that no pressure is generated in the passage 23. However, energizing the valve 47 to a position at which the flow rate through the valve is less than the flow rate through the fixed orifice 46 causes pressure to be generated in the regulated passage 23 for moving the main stage 17 rightward.

In view of the above, it is readily apparent that the structure of the present invention provides an improved two stage electrohydraulic pressure control valve in which a first stage provides regulated pressure at lower flows for a larger main stage that handles the higher control flows. The pressure from the pilot stage acts on a moving area connected to the motion of the main stage such that flow from the first stage moves the second stage. Each stage has a pressure feedback so that the outlet control pressure from the control valve is roughly proportional to an electrical input signal. An energy storage means connected to the pilot chamber of the main stage permits the main stage to move independently of the pilot stage. When the clutch or brake become engaged, the main stage moves quickly as its flow demand changes with the energy storage means quickly providing or accepting displaced fluid from the main stage much faster than the limited flow capacity and response time of the first stage. The energy storage means thus attenuates disturbances, minimizes overshoots and greatly improves stability of the control valve.

Other aspects, objects and advantages of this invention can be obtained from a study of the drawings, the disclosure and the appended claims.

I claim:

1. A two stage electrohydraulic pressure control valve for use in a hydraulic system in which the output flow demand from the control valve suddenly changes from a high flow condition to a low flow, pressure controlled condition comprising:

a solenoid controlled pilot stage;

a force controlled main stage being movable between a fully open position and a closed position and having first and second ends and a control port connected to the first end; and energy storage means connected to the pilot stage and the second end of the main stage for allowing instantaneous independent movement of the main stage relative to the pilot stage, the energy storage means having a predetermined pressure range and is sized so that the dynamic pressure changes caused by displacement of the main stage from the fully open position to the closed position is less than about 25 percent of the predetermined pressure range of the energy storage means.

2. The control valve of claim 1 wherein the dynamic pressure change is in the range of about 8 percent to 4 percent.

3. A two stage electrohydraulic pressure control valve for use in a hydraulic system in which the output flow demand from the control valve suddenly changes from a high flow condition to a low flow, pressure controlled condition comprising:

a solenoid controlled pilot stage;

a force controlled main stage being movable between a fully open position and a closed position and having first and second ends and a control port connected to the first end; and energy storage means connected to the pilot stage and the second end of the main stage for allowing instantaneous independent movement of the main stage relative to the pilot stage;

wherein the main stage has a pilot chamber at the second end thereof and the energy storage means includes an accumulator having a piston, a fluid chamber at one side of the piston, and a spring disposed at the other side of the piston, and including a regulated pressure passage connecting the pilot stage to both the pilot chamber and the fluid chamber.

4. A two stage electrohydraulic pressure control valve for use in a hydraulic system in which output flow demand from the control valve suddenly changes from a high flow condition to a low flow, pressure controlled condition comprising:

a solenoid controlled pilot stage;

a force controlled main stage being movable between a fully open position and a closed position and having first and second ends and a control port connected to the first end: and energy storage means connected to the pilot stage and the second end of the main stage for allowing instantaneous independent movement of the main stage relative to the pilot stage, the energy storage means including a load piston, a fluid chamber at one side of the load piston and a spring disposed between the load piston and the second end of the main stage, and including a regulated pressure passage connecting the pilot stage to the fluid chamber.

* * * * *